United States Patent Office 3,254,948
Patented June 7, 1966

3,254,948
PROCESS OF REMOVING IRON FROM
ALUMINUM SALT SOLUTIONS
Carl E. Stromberg, Richmond, and Richard W. Davis,
Martinez, Calif., assignors to Stauffer Chemical Company, New York, N.Y., a corporation of Delaware
No Drawing. Filed Sept. 3, 1963, Ser. No. 306,292
6 Claims. (Cl. 23—92)

The present invention relates to the removal of iron from aluminum compounds and more specifically, the removal of iron from aluminum sulfate, hereinafter referred to as alum, and aluminum chloride solutions.

The removal of iron from alum and aluminum chloride liquors is for many uses most desirable. An example of this is the paper industry where alum is used for the clarification of processed water, setting of certain types of dyes, the sizing of paper, and in the pharmaceutical industry. To produce high quality paper, alum which is low in iron content must be used.

On the market today alum is available in two grades: (1) the commercial grade (0.5% maximum iron content) and (2) iron free alum (0.005% maximum iron content). The iron free alum which is presently available commercially can be made only by the use of starting materials which are initially low in iron content.

By the present invention, commercial grade alum can readily be converted into iron free alum which contains around 2 to 5 p.p.m. iron. Marginal bauxite deposits which contain more than the tolerable amount of iron for conversion into commercial grade alum are also of utility when the practice of the present invention is employed, and such deposits would then yield either commercial grade alum or iron free alum as desired.

Heretofore, attempts to prepare commercial grade and iron free alum have been long and laborious with much concern of the iron content. Normally only high grade or refined alumina can be used with various methods of iron removal and color clarification.

Therefore, it is an object of this invention to provide a method for the removal of undesirable iron from aluminum sulfate and aluminum chloride solutions.

Pursuant to the above mentioned and yet further objects, it has been found that the removal of iron from aluminum sulfate and aluminum chloride liquor can be accomplished by treating the liquor with a diketone to form an iron chelate which in turn is removed by solvent extraction.

In general, the iron removal can be carried out in any suitable device for intimate mixing of liquids, such as a liquid-liquid column extractor. The aluminum sulfate or aluminum chloride liquor is mixed with the diketone and then separated. Further extractions of the resulting liquors can be performed to remove traces of dissolved diketone. The diketone, now complexed with the iron, can be recovered by treatment with an acid, such as hydrochloric acid. Two phases are present and can be separated. The passage of the aqueous phase through an ion exchange column will render the hydrochloric acid iron free. The diketone can be used as such or distilled to separate the organic solvent.

The removal of iron can be carried out using any number of different diketones. Since some ketones exist much more in the tautomeric enol form than do others, the particular diketones of interest here are the beta-diketones wherein a conjugated double bond system is present when the ketone is in the enol form. The phenomenon of keto-enol tautomerism is well understood by those skilled in the chemical arts. The double bond conjugation greatly increases the enolization and therefore the activity of the hydrogen atom on the adjacent carbon atom. The hydrogen atom is then capable of being replaced in the process known as chelation, according to the following formula:

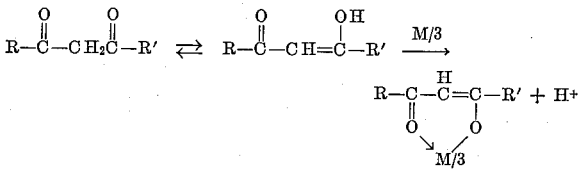

The preferred diketones are acetylacetone (2,4-pentanedione) and thenoyltrifluoroacetone (4,4,4-trifluoro-1,2-thienyl 1,1,3-butanedione).

The diketone may be used in excess as its own solvent or with a water insoluble organic solvent, such as benzene, toluene, carbon tetrachloride and the like. Likewise, for the removal of traces of diketone from the liquor the solvents mentioned above can be used. The choice of solvent, if one is used, can be based on insolubility in water, flammability, boiling point, toxicity, cost and specific gravity.

The iron to be extracted must be in the higher valent ferric form. It is necessary, therefore, to subject the iron containing aluminum sulfate or aluminum chloride liquor to an oxidation procedure to convert the divalent ferrous (+2) to the ferric (+3) trivalent state. This oxidation can be carried out successfully by using an oxidant, such as bromine water or ammonium persulfate.

The amount or diketone used to chelate the iron in the liquor depends on the use of a solvent. The quantity of diketone should always be in excess of the iron present. The amount of iron extracted will be determined by the extraction time and efficiency of mixing. In this way the level of the iron concentration in the final product can be regulated to any desired value. The present invention allows the user to take commercial grade aluminum sulfate liquor and remove the iron to any level, including being free of iron (2 p.p.m.).

The process of the present invention can be carried out in either a continuous or a batchwise manner. The iron chelate formation is effected by simply mixing the diketone and aluminum sulfate or aluminum chloride liquor containing iron after suitable oxidation of the ferrous iron to ferric iron. The dilketone is then separated either by itself, if used as its own solvent, or with a suitable water insoluble organic solvent. Several further washings with the organic solvent is usually sufficient to remove residual diketone from the extracted liquor. These washings and extraction processes lend themselves to either the continuous or batchwise manner of commercial production. The diketone and solvent, if one is used, can be separated by distillation and each can be further recycled.

The use of moderately water-soluble diketones, such as 2,4-pentanedione, facilitates the passage of the diketone into the aqueous phase to form the ferric chelate. However, the water solubilities present a difficulty in removing excess diketone from the liquor. This can be overcome by additional extractions. The use of a diketone, such as thenoyltrifluoroacetone, which is very insoluble in water allows for easy separation from the aqueous liquor phase. Due to the decreased solubility, vigorous agitation is needed to contact the alum phase for the initial chelation of the iron. Thenoyltrifluoroacetone and benzoyl acetone both are less soluble than 2,4-pentanedione and offer similar action. They both work well in strong acidic media and can easily find use in acid-alum mixtures.

The iron-diketone chelate can be broken with an acid, such as hydrochloric acid or sulfuric acid, to recover the diketone for recycling in the process. After treatment with hydrochloric acid the aqueous phase can be passed through an ion exchange column containing a suitable exchange resin, such as a basic quaternary amine type.

The following examples illustrate the preparation of iron free aluminum sulfate and aluminum chloride according to the present invention.

*Example I*

100 grams of aluminum sulfate solution (8.2–8.4% aluminum oxide) with 840 p.p.m. iron was oxidized with bromine water to convert the ferrous to ferric iron. Four milliliters of 1.0 N sodium hydroxide was added so as to adjust the pH to 3 or 4. The solution was extracted with three portions of the solution 50 ml. toluene and 5 ml. acetylacetone. This was followed by three extractions of 50 ml. toluene each. The final result was 13 p.p.m. iron remaining in the alum liquor. Further extractions lowered the amount of iron present to 2–5 p.p.m.

The extraction with acetylacetone should be carried out in solutions of pH 3 or greater so as to allow neutralization of the sulfuric acid formed in the chelation reaction.

*Example II*

A solution of thenoyltrifluoroacetone was made up of 0.5 m. in toluene. 100 g. of alum liquor (8.2–8.4% aluminum oxide) was made acid with 15 ml. of 1 N sulfuric acid to the extent of 1½% free acid present in the solution. This was then extracted with three 50 ml. portions of the toluene-thenoyltrifluoroacetone solution. The iron content decreased from 840 p.p.m. to 50 p.p.m.

It was found that thenolytrifluoroacetone was more efficient in extracting from an acidic solution. The low water solubility of the chelating agent requires a longer period of agitation in order to effect an adequate extraction of the iron from the alum solution. Concentrated sulfuric acid is used to break the chelate and release the thenoyltrifluoroacetone which is then ready for further extraction.

*Example III*

The extraction of 40 g. of commercial aluminum chloride liquor (28%) containing 125 p.p.m. iron was carried out. The liquor was made basic with 25 ml. of 1.0 N sodium hydroxide solution after oxidation of the ferrous iron to ferric iron with bromine water. An extracting solution of 25 ml. toluene and 1 ml. acetylacetone was used. The aluminum chloride liquor after three extractions contained 10 p.p.m. ferric oxide. This decrease in iron content was noticeable by the decolorization of the original aluminum chloride liquor.

Various changes and modifications may be made in the process described herein as will be apparent to those skilled in the chemical arts. It is accordingly intended that the present invention shall only be limited by the scope of the appended claims.

We claim:

1. A process of removing iron from aluminum sulfate and aluminum chloride solutions, which comprises extracting an aqueous solution of a salt selected from the group consisting of aluminum sulfate and aluminum chloride in which the iron is present in the trivalent form, with a beta-diketone to form an iron chelate and separating said iron chelate from said aluminum salt solution.

2. A process of removing iron from aluminum sulfate and aluminum chloride solutions, which comprises extracting an aqueous solution of a salt selected from the group consisting of aluminum sulfate and aluminum chloride in which the iron is present in the trivalent form, with a diketone selected from the group consisting of 2,4-pentanedione, thenoyltrifluoroacetone and benzoyl acetone so as to form an iron chelate and separating said iron chelate from said aluminum salt solution.

3. A process of removing iron from aqueous aluminum sulfate and aqueous aluminum chloride solutions comprising treating said aqueous aluminum salt solutions in which said iron is in the trivalent form with a beta-diketone and extracting the iron (III)-diketone chelate formed thereby with a water insoluble organic solvent.

4. A process of removing iron from aqueous aluminum sulfate and aqueous aluminum chloride solutions comprising treating said aqueous aluminum salt solutions in which said iron is in the trivalent form with a diketone selected from the group consisting of 2,4-pentanedione, thenoyltrifluoroacetone and benzoylacetone, and extracting the iron (III)-diketone chelate formed thereby with an organic solvent.

5. A process of removing iron from aqueous aluminum sulfate and aqueous aluminum chloride solutions comprising treating said aqueous aluminum salt solutions in which said iron is in the trivalent form with a beta-diketone and extracting the iron (III)-diketone chelate formed thereby with an organic solvent and subsequently recovering said beta-diketone from said chelate by treatment with an inorganic acid and recycling said recovered diketone.

6. A process of removing iron from aqueous aluminum sulfate and aqueous aluminum chloride solutions comprising treating said aqueous aluminum salt solutions in which said iron is in the trivalent form with a diketone selected from the group consisting of 2,4-pentanedione, thenoyltrifluoroacetone and benzoylacetone and extracting the iron (III)-diketone chelate formed thereby with an organic solvent and subsequently recovering said diketone from said chelate treatment with an inorganic acid and recycling said recovered diketone.

References Cited by the Examiner

UNITED STATES PATENTS

| | | | |
|---|---|---|---|
| 1,870,214 | 8/1932 | Aickelin et al. | 23—312 |
| 1,897,740 | 2/1933 | Teller | 23—87 X |
| 2,416,508 | 2/1947 | Barnes | 23—123 |

FOREIGN PATENTS 46,292  12/1962  Poland.

BENJAMIN HENKIN, *Primary Examiner.*

MAURICE A. BRINDISI, *Examiner.*

E. STERN, *Assistant Examiner.*